United States Patent
Zhang et al.

(10) Patent No.: US 9,611,435 B2
(45) Date of Patent: *Apr. 4, 2017

(54) METHOD FOR SELECTIVE HYDROGENATION OF UNSATURATED COMPOUND

(71) Applicant: PetroChina Company Limited, Beijing (CN)

(72) Inventors: Xuejun Zhang, Beijing (CN); Guanjing Wu, Beijing (CN); Pingyi Wu, Beijing (CN); Xiaoliang Yuan, Beijing (CN); Yuandong Hou, Beijing (CN); Yin Zhang, Beijing (CN); Qinfeng Zhao, Beijing (CN); Shuqin Wang, Beijing (CN); Kunhong Liu, Beijing (CN)

(73) Assignee: Petrochina Company Limited, Beijing (CN)

( * ) Notice: Subject to any disclaimer, the term of this patent is extended or adjusted under 35 U.S.C. 154(b) by 91 days.

This patent is subject to a terminal disclaimer.

(21) Appl. No.: 14/432,150

(22) PCT Filed: Nov. 8, 2012

(86) PCT No.: PCT/CN2012/001508
§ 371 (c)(1),
(2) Date: Mar. 27, 2015

(87) PCT Pub. No.: WO2014/047753
PCT Pub. Date: Apr. 3, 2014

(65) Prior Publication Data
US 2015/0299585 A1   Oct. 22, 2015

(30) Foreign Application Priority Data
Sep. 28, 2012   (CN) .......................... 2012 1 0366418

(51) Int. Cl.
| C10G 45/38 | (2006.01) |
| B01J 23/85 | (2006.01) |
| B01J 23/882 | (2006.01) |
| B01J 23/883 | (2006.01) |
| B01J 23/888 | (2006.01) |
| C10G 45/60 | (2006.01) |
| B01J 35/00 | (2006.01) |
| B01J 35/10 | (2006.01) |
| B01J 37/00 | (2006.01) |
| B01J 37/02 | (2006.01) |

(52) U.S. Cl.
CPC .............. *C10G 45/38* (2013.01); *B01J 23/85* (2013.01); *B01J 23/882* (2013.01); *B01J 23/883* (2013.01); *B01J 23/888* (2013.01); *B01J 35/002* (2013.01); *C10G 45/60* (2013.01); *B01J 35/1014* (2013.01); *B01J 35/1019* (2013.01); *B01J 35/1038* (2013.01); *B01J 37/0009* (2013.01); *B01J 37/0203* (2013.01); *B01J 37/0207* (2013.01)

(58) Field of Classification Search
None
See application file for complete search history.

(56) References Cited

U.S. PATENT DOCUMENTS

| 3,953,518 A * | 4/1976 | Wehrli .................. C07C 45/515 560/106 |
| 5,569,802 A | 10/1996 | Luken et al. |
| 7,612,245 B2 | 11/2009 | Hillion et al. |
| 7,645,376 B2 | 1/2010 | Bouchy et al. |
| 7,718,053 B2 | 5/2010 | Bouchy et al. |
| 7,736,492 B2 | 6/2010 | Bouchy et al. |
| 2002/0148758 A1 * | 10/2002 | Chang .................... C10G 45/10 208/217 |
| 2004/0007504 A1 | 1/2004 | Uzio et al. |
| 2004/0045871 A1 | 3/2004 | Bauer |
| 2015/0290626 A1 * | 10/2015 | Zhang .................... B01J 23/883 502/314 |

FOREIGN PATENT DOCUMENTS

| CN | 1351122 A | 5/2002 |
| CN | 1597093 A | 3/2005 |
| CN | 1769385 A | 5/2006 |

(Continued)

OTHER PUBLICATIONS

International Search Report issued in related International Application No. PCT/CN2012/001507 on Jul. 4, 2013.
Translation of International Search Report issued in related International Application No. PCT/CN2012/001507 on Jul. 4, 2013.
Fan Yu et al., Effect of Carrier Composition on Hydroisomerization and Aromatization Performances of Ni—Mo/ Aluminosilicate Zeolite Catalyst for FCC Gasoline Upgrading. Acta Petrolei Sinica (Petroleum Processing Section). Apr. 2005, vol. 21, No. 2, pp. 1-7, ISSN 1001-8719.
International Search Report issued in International Application No. PCT/CN2012/001508 on Jul. 4, 2013.

(Continued)

*Primary Examiner* — Tam M Nguyen
(74) *Attorney, Agent, or Firm* — Meunier Carlin & Curfman LLC

(57) ABSTRACT

The present invention relates to a method for the selective hydrogenation of an unsaturated compound, particularly a method in an unsaturated compound or a mixture containing unsaturated compounds for increase of the light sulphides weight, hydrogenation of a polyunsaturated compound and isomerization of a monounsaturated compound. The method uses a supported catalyst. The supported catalyst contains at least one Group VIB non-noble metal oxide and at least one Group VIII non-noble metal oxide deposited on a carrier; and the catalyst has an optimized acid distribution on the surface of the catalyst, and more preferably has an optimized Group VIII/VIB metal ratio and a Group VIII non-noble metal density per unit of catalyst surface area.

20 Claims, No Drawings

(56) References Cited

FOREIGN PATENT DOCUMENTS

| CN | 101024779 A | 8/2007 |
|---|---|---|
| CN | 101665720 A | 3/2010 |
| CN | 200910170584.6 A | 3/2010 |
| CN | 101869839 A | 10/2010 |
| CN | 102039151 A | 5/2011 |
| CN | 102166520 A | 8/2011 |
| CN | 103146420 A | 6/2013 |

OTHER PUBLICATIONS

English Translation of International Search Report issued in International Application No. PCT/CN2012/001508 on Jul. 4, 2013.
First Office Action received in related Chinese Application No. 201210366418.5 on May 28, 2014 and English translation.
Search Report issued in related Chinese Application No. 201210366418.5 and English translation.
Preparation and Characterization of Co—Mo/TiO2—Al2O3 catalysts for selective hydrodesulphurization, Journal of Xian Shiyou University, Jul. 2008, vol. 23, No. 4, pp. 62-69.
Search Report issued in related CN Application No. 201210367401.1 and English translation.

* cited by examiner

METHOD FOR SELECTIVE HYDROGENATION OF UNSATURATED COMPOUND

FIELD OF TECHNOLOGY

The present invention relates to a method for selective hydrogenation of an unsaturated compound.

BACKGROUND ART

During a selective hydrogenation process for unsaturated compounds, the raw materials may contain certain amounts of sulphides in addition to the unsaturated compounds, and all of the sulphides or portion of them are light sulphides. These light sulphides can react with polyunsaturated compounds in the raw materials under the action of a hydrogenation catalyst to generate heavy sulphides, which can be removed by a process of fractionation.

The polyunsaturated compounds in the raw materials as described above have very unstable properties and are easy to be polymerized during storage and subsequent processing. Under the action of the hydrogenation catalyst, a portion of the polyunsaturated compounds can be selectively hydrogenated into monounsaturated compounds.

At the time of hydrogenating the polyunsaturated compounds into monounsaturated compounds, a small portion of the polyunsaturated compounds or monounsaturated compounds are hydrogenated into saturated compounds, and the occurrence of such reaction can be avoided as much as possible by optimized design for the catalyst.

The methods of hydrogenation treatment for an unsaturated compound are proposed in the following patents or patent applications.

CN03815240.1 proposes a method for selective hydrogenation of polyunsaturated compounds into monounsaturated compounds using a homogeneous catalyst. This method uses at least one salt of a transition metal element from Groups IB, IIB, VB, VIB, VIIB and VIII of the periodic table, at least one ligand and at least one organometallic reducing agent.

CN200610064286.5 proposes a method of selective hydrogenation using a catalyst having controlled porosity. The method uses a catalyst on a carrier, comprising at least one metal from Group VIB and at least one non-noble metal from Group VIII used in the sulphurized form deposited on the carrier and having a controlled porosity, wherein: the weight content of Group VIB element oxide is necessarily higher than 12% by weight; the weight content of Group VIII element oxide is lower than 15% by weight; the sulphurization degree of metal components in the catalyst is at least equal to 60%; and the pore volume having a diameter larger than 0.05 microns in the catalyst is 10~40% of total pore volume.

CN200610064287.x proposes a method for selective hydrogenation employing a sulphurized catalyst. The method uses a catalyst deposited on a carrier and comprising at least one metal from Group VIB and at least one non-noble metal from Group VIII, wherein: the weight content of Group VIB element oxide is necessarily higher than 12% by weight; the weight content of Group VIII element oxide is lower than 15% by weight; the sulphurization degree of metal components in the catalyst is at least equal to 60%; and the molar ratio of the non-noble metal from Group VIII to the metal from Group VIB is 0.2~0.5 mole/mole.

CN200610064397.6 proposes a method of selective hydrogenation using a catalyst with a specific carrier. The method uses a supported catalyst comprising at least one metal from Group VIB and at least one non-noble metal from Group VIII used in the sulphurized form, deposited on a specific carrier comprising a metal aluminate of the $MAl_2O_4$ type with a metal M selected from nickel and cobalt.

CN200910170584.6 proposes a method for selective hydrogenation using a sulphurated catalyst with a specified composition. The catalyst comprises at least one metal from Group VIB and at least one non-noble metal from Group VIII supported on alumina, wherein: the Group VIB metal oxide is 4~20% by weight of the catalyst; the Group VIII non-noble metal oxide is less than 15% by weight of the catalyst; the molar ratio of the non-noble metal from Group VIII to the metal from Group VIB is 0.6~3.0 mole/mole; and the catalyst has a total pore volume of 0.4~1.4 $cm^3/g$.

SUMMARY OF THE INVENTION

The present invention proposes to use methods such as optimizing surface acid distribution and the like to selectively hydrogenate unsaturated compounds, and achieve the object of increase of light sulphides weight and isomerization of monounsaturated compounds.

A method for selective hydrogenation of an unsaturated compound, which increasing of light sulphides weight and comprising performing isomerization reaction of monounsaturated compounds when the selective hydrogenation occurs, characterized in that a catalyst having at least one Group VIB metal and at least one Group VIII non-noble metal supported on a carrier is used in the method, wherein:

- the amount by weight of the Group VIB element oxide is 4~10%, preferably 6~8%;
- the amount by weight of the Group VIII non-noble element oxide is 6~15%, preferably 8~12%;
- the ratio $B_{total}/L_{total}$ of B acid to L acid in the surface acidity center of the catalyst is not more than 0.4, preferably 0.05~0.3;
- the ratio $L_{weak}/L_{strong}$ of weak L acid to strong L acid in the surface acidity center of the catalyst is 0.5~2.0, preferably 0.5~1.5; and
- the carrier is or substantially is alumina In the present invention, the molar ratio of the Group VIII non-noble metal oxide to the Group VIB metal oxide in the catalyst is preferably more than 3.0 mole/mole and equals to or less than 5.0 mole/mole, especially from 3.2 to 5.0 mole/mole; the density of the Group VIII element per unit surface area of the catalyst is not less than $8 \times 10^{-4}$ g of Group VIII element oxide/$m^2$ of catalyst, especially not less than $10 \times 10^{-4}$ g of Group VIII element oxide/$m^2$ of catalyst, by virtue of which the effect is better.

Like the prior art, when being used, the catalyst needs to be sulphurized under the same sulphurization conditions as in the prior art, for example, metal oxides were conversed to sulfides. Typically, sulphurization is carried out under the following sulphurization conditions: a pressure of 0.5~3.0 MPa; a sulphurization temperature of 200~500° C.; a sulphurization space velocity of 0.5~5.0 $h^{-1}$; and an atmosphere of hydrogen, hydrogen sulfide.

The conditions for using the catalyst can be: a pressure of 1.0~5.0 MPa; a hydrogen/polyunsaturated compound molar ratio of 1~20 mole/mole; a space velocity of 2.0~6.0 $h^{-1}$; and a temperature of 50~250° C.

When the unsaturated compounds or the mixtures containing the unsaturated compounds are treated by employing the method of the present invention, the treatment is allowed to operate at a relative higher hydrogen/polyunsaturated compound molar ratio (e.g., more than 5.0), and the degree by which the monounsaturated compounds are hydrogenated into saturated compounds is very low, which results in large operation flexibility.

In a process of selective hydrogenation for unsaturated compounds, several reactions (included without limitation thereto) may take place as follows:

(1) Addition Reaction of Polyunsaturated Compounds:

Since polyunsaturated compounds are highly active and tend to take addition reactions with other compounds to produce compounds having larger molecular weights. When sulfides, in particular light sulfides, are included in the reaction system, sulfides having higher boiling points can be produced by utilizing the addition reactions of polyunsaturated compounds, and such sulfides can be removed by a process of fractionation.

(2) Selective Hydrogenation of Polyunsaturated Compounds into Monounsaturated Compounds:

Under the action of a catalyst, the polyunsaturated compounds can be selectively hydrogenated into monounsaturated compounds.

(3) Isomerization of Monounsaturated Compounds:

During the process of hydrogenation, monounsaturated compounds can take an isomerization reaction, which contributes to improve the stability of the monounsaturated compounds.

(4) Hydrogenation of Monounsaturated Compounds:

At the time of hydrogenation of polyunsaturated compounds into monounsaturated compounds, a small portion of the monounsaturated compounds are hydrogenated into saturated compounds. In most instances, it is desirable for the monounsaturated compounds to be retained. As a result, the monounsaturated compounds are required to be hydrogenated to minimum level by optimization of catalysts and conditions.

Under the action of the acidity center of a catalyst, the unsaturated compounds in processed raw materials tend to take polymerization reaction to produce raw coke precursors such as colloids and the like, and these substances would cover the surface activity center of the catalyst, impacting on the exertion of catalytic action. However, as for reaction of sulphides weight increase and isomerization reaction, the catalyst is further required to have a certain acidity center. As a result, in the design of a catalyst, in order to meet the requirements of various reactions, it is necessary to adjust the constitution of acidity center of the catalyst and distribution of strong, weak acidity centers.

The methods for adjusting the ratio of B acid to L acid and the ratio of weak L acid to strong L acid in the surface acidity center of the catalyst are not limited in the present invention. Methods of this aspect are also described in the book "Hydrogenation process and engineer", *China Petrochemical Press*, for instance, modification of carriers by using non-metal oxides, hydrothermal treatment of catalyst carriers, and the like. The present invention could employ, but not limited to, the methods described therein. Therefore, the composition of a carrier is not particularly limited in the present invention, provided that the ratio of B acid to L acid and the ratio of weak L acid to strong L acid specified in this invention can be satisfied. The carrier recommended in this invention is or substantially is alumina. The content of alumina is preferably not less than 80 wt %, more preferably not less than 90 wt %. As for different carrier compositions, the adjustment method of the surface acidity centers thereof can be varied, which is a basic means of carrier modification. In addition to "Hydrogenation Technology and Engineering", there are numerous literatures that relate to methods for adjusting the surface acidity center of a carrier, such as those in CN102039151, CN1597093 and the like. Thus, the requirement of a carrier to have a specific surface acidity center has been completely achieved in the prior art, and manufacturers can provide corresponding products depending on the users' needs. For instance, a well-known method in the art is used to prepare a catalyst carrier: as needs, the carrier can be modified with non-metal oxides or precursors, and the resulting carrier can either be treated with water vapor at 400~600° C. for 4~6 h, or be calcinated at a temperature of 500~700° C. or 700~900° C. or 900~1100° C. for 4~6 h. By this method, the properties of the acidity center of the catalyst and the distribution of strong/weak acid centers can be adjusted. Preferably, the total pore volume of the catalyst is 0.2~0.5 $cm^3/g$, more preferably 0.2~0.45 $cm^3/g$, and most preferably 0.2~0.39 $cm^3/g$. Preferably, the specific surface of the catalyst is 50~200 $m^2/g$, more preferably 50~150 $m^2/g$.

From the study on the hydrogenation reaction system of unsaturated compounds or a mixture containing the unsaturated compounds, the inventors found that the effect of hydrogenation treatment improves notably as the catalyst has the features according to the present invention.

Pyridine infrared analysis is used to analyze the acidity center of the catalyst. This method is described in detail in "Modern Research Methods of Catalysis" published by Science Press, in chapter 7, in-situ infrared spectroscopy.

As for other parameters, well-known analysis and calculation methods in the art are used.

Various technical means, such as tableting, mixing and kneading, ball milling, extrusion, forming by spraying and the like, can be used to prepare a catalyst carrier. The catalyst carrier can be modified by various technical means to satisfy the requirement for the properties of the catalyst in this method.

The preparation method for a catalyst is not particularly limited in the present invention, and general impregnation methods can be employed, for example, the salts of active components, nickel and/or molybdenum, can be added into water or another solution being capable of forming complexes to produce an active metal impregnating solution. The catalyst carrier was impregnated by the active metal impregnating solution, and then dried at 120~300° C. and calcinated at 400~800° C.

DETAILED DESCRIPTION OF PREFERRED EMBODIMENTS

Examples 1~5 and Comparative Examples 1~4

Unless otherwise specified in the present invention, each carrier in examples and comparative examples indicates a carrier produced by subjecting it to calcination at 500° C. or high temperature treatment at 600~1000° C. or treatment with water vapor at 400~600° C. for 4~6 h, and modification with inorganic oxide precursors. Physical properties are as shown in Table 1.

Unless otherwise specified, for all of the catalysts in examples and comparative examples, Group VIII non-noble metal salts and Group VIB metal salts are formulated into impregnating solution having different concentration according to the desired load of active metal, molar ratio of Group VIII non-noble metal oxides to Group VIB metal oxides and the like, and the catalyst carriers are impregnated therein, then aged for 12 h at normal temperature, followed by drying at 120° C. and calcination at 500° C., to produce catalyst products.

For further illustrating the process for obtaining the catalyst, several examples are described herein in detail, and others can refer to the mentioned steps and produce desired catalysts as required.

Comparative Example 1

Catalyst Preparation 100 g of industrial grade $SiO_2$—$Al_2O_3$ powder ($SiO_2$ content: 14%) was added with 50 g of water and then was subjected to kneading and extrusion molding. The resultant was then dried at 120° C. and calcinated at 600° C. for 4 h to produce a catalyst carrier.

14 g of industrial grade ammonium molybdate was added into 45 g of water, and stirred to be dissolved. Next, 75 g of industrial grade nickel nitrate, 12 g of industrial grade citric acid were added thereto and stirred to be dissolved, to produce an active metal impregnating solution for catalyst.

The catalyst carrier was added into this impregnating solution, impregnated at normal temperature for 3 h. After that, the impregnated catalyst carrier was taken out and aged for 12 h, then dried at 120° C. and calcinated at 500° C. for 4 h to produce Catalyst A. This catalyst has a specific surface of 148 $m^2/g$, a total pore volume of 0.41 $cm^3/g$, $MoO_3$ content of 6.4% and NiO content of 10.6%. More data for property analysis are shown in Table 1.

Comparative Example 2

Catalyst Preparation 100 g of industrial grade alumina powder was added with 50 g of water and then was subjected to kneading and extrusion molding. The resultant was then dried at 120° C. and calcinated at 500° C. for 4 h to produce a catalyst carrier.

14 g of industrial grade ammonium molybdate was added into 45 g of water, and stirred to be dissolved. Next, 75 g of industrial grade nickel nitrate, 12 g of industrial grade citric acid were added thereto and stirred to be dissolved, to produce an active metal impregnating solution for catalyst.

The catalyst carrier was added into this impregnating solution, impregnated at normal temperature for 3 h. After that, the impregnated catalyst carrier was taken out and aged for 12 h, then dried at 120° C. and calcinated at 500° C. for 4 h to produce Catalyst B. This catalyst has a specific surface of 240 $m^2/g$, a total pore volume of 0.38 $cm^3/g$, $MoO_3$ content of 6.4% and NiO content of 10.6%. More data for property analysis are shown in Table 1.

Example 1

Catalyst Preparation 100 g of industrial grade alumina powder was added with 50 g of water and then was subjected to kneading and extrusion molding. The resultant was then dried at 120° C. and calcinated at 500° C. for 4 h, and was further calcinated at 900° C. for 4 h to produce a catalyst carrier.

14 g of industrial grade ammonium molybdate was added into 45 g of water, and stirred to be dissolved. Next, 75 g of industrial grade nickel nitrate, 12 g of industrial grade citric acid were added thereto and stirred to be dissolved, to produce an active metal impregnating solution for catalyst.

The catalyst carrier was added into this impregnating solution, impregnated at normal temperature for 3 h. After that, the impregnated catalyst carrier was taken out and aged for 12 h, then dried at 120° C. and calcinated at 500° C. for 4 h to produce Catalyst E. This catalyst has a specific surface of 101 $m^2/g$, a total pore volume of 0.38 $cm^3/g$, $MoO_3$ content of 6.4% and NiO content of 10.6%. More data for property analysis are shown in Table 1.

Example 2

Catalyst Preparation 100 g of industrial grade alumina powder was added with 50 g of water and then was subjected to kneading and extrusion molding. The resultant was then dried at 120° C. and calcinated at 500° C. for 4 h, and was further treated in water vapor at 450° C. for 4 h to produce a catalyst carrier.

18 g of industrial grade ammonium molybdate was added into 45 g of water, and stirred to be dissolved. Next, 95 g of industrial grade cobalt nitrate, 16 g of industrial grade citric acid were added thereto and stirred to be dissolved, to produce an active metal impregnating solution for catalyst.

The catalyst carrier was added into this impregnating solution, impregnated at normal temperature for 3 h. After that, the impregnated catalyst carrier was taken out and aged for 12 h, then dried at 120° C. and calcinated at 500° C. for 4 h to produce Catalyst F. This catalyst has a specific surface of 97 $m^2/g$, a total pore volume of 0.35 $cm^3/g$, $MoO_3$ content of 9.1% and CoO content of 14.8%. More data for property analysis are shown in Table 1.

The preparation methods for other catalysts would not to be repeated in detail, and respective catalysts were obtained according to desired performances.

The physical properties and compositions of Catalysts A, B, C, D, E, F, G, H and I are as shown in Table 1.

TABLE 1

| Composition and Physical properties of Catalysts A, B, C, D, E, F, G, H and I | | | | | | | | | |
|---|---|---|---|---|---|---|---|---|---|
| | Comparative Example | | | | Example | | | | |
| | 1 | 2 | 3 | 4 | 1 | 2 | 3 | 4 | 5 |
| | Catalyst No. | | | | | | | | |
| | A | B | C | D | E | F | G | H | I |
| Carrier: | $SiO_2$ (20%)-$Al_2O_3$ | $Al_2O_3$ | $Al_2O_3$ | $Al_2O_3$ | $Al_2O_3$ | $Al_2O_3$ | $SiO_2$ (2%)-$Al_2O_3$ | $SiO_2$ (10%)-$Al_2O_3$ | $TiO_2$ (5%)-$Al_2O_3$ |
| Total pore volume $cm^3/g$ | 0.41 | 0.38 | 0.38 | 0.38 | 0.38 | 0.35 | 0.42 | 0.39 | 0.28 |

TABLE 1-continued

Composition and Physical properties of Catalysts A, B, C, D, E, F, G, H and I

| | Comparative Example | | | | Example | | | | |
|---|---|---|---|---|---|---|---|---|---|
| | 1 | 2 | 3 | 4 | 1 | 2 | 3 | 4 | 5 |
| | | | | | Catalyst No. | | | | |
| | A | B | C | D | E | F | G | H | I |
| Specific surface $m^2/g$ | 148 | 240 | 101 | 101 | 101 | 97 | 96 | 142 | 165 |
| $MoO_3$ % | 6.4 | 6.4 | 5.0 | 11.0 | 6.4 | 9.1 | 6.3 | | 5.6 |
| NiO % | 10.6 | 10.6 | 5.8 | 4.0 | 10.6 | | 11.7 | 11.5 | 13.2 |
| $WO_3$ % | | | | | | | | 7.0 | |
| CoO % | | | | | | 14.8 | | | |
| Molar ratio of Group VIII metal/Group VIB metal | 3.2 | 3.2 | 2.2 | 0.7 | 3.2 | 3.1 | 3.6 | 5.0 | 4.5 |
| $d_{Group\ VIII\ element\ oxide}$ ($10^{-3}$ g/$m^2$) | 0.7 | 0.4 | 0.6 | 0.4 | 1.1 | 1.5 | 1.2 | 0.8 | 0.8 |
| $B_{total}/L_{total}$ | 0.47 | 0 | 0 | 0 | 0 | 0 | 0.06 | 0.28 | 0 |
| $L_{weak}/L_{strong}$ | 0.8 | 2.3 | 1.2 | 1.2 | 1.2 | 2.0 | 0.6 | 0.8 | 0.7 |

Among these catalysts, catalysts E, F, G, H and I are the catalysts of the present invention. In contrast, catalysts A, B, C and D do not belong to the catalysts of the present invention.

Hydrogenation of Catalysts

A catalyst is charged into the middle part of a reaction tube having an inner diameter of 15 mm and a height of 320 mm, of which the upper and lower parts are filled with quartz sand of 20~40 mesh for supporting.

The catalyst is sulphurized before use. The sulphurizing oil is a mixture of cyclohexane and carbon disulfide ($CS_2$ content is 2%). Sulphurization conditions are: a pressure of 2.0 MPa; a liquid hourly space velocity of 4 $h^{-1}$; hydrogen-to-oil volume ratio of 200:1; a temperature of 320° C.; and a sulphurization time of 12 h.

The mixture of unsaturated compounds for testing has the following composition: 100 ppm by weight of propanethiol; 1% by weight of pentadiene; 3% by weight of 1-heptylene; and balance of cyclohexane.

In the present invention, important technical parameters for evaluating catalyst performance are expressed as follows:

conversion rate of propanethiol %=(1−propanethiol content in product/propanethiol content in raw material)*100 conversion rate of dienes %=(1−dienes content in product/dienes content in raw material)*100 conversion rate of monoenes %=(1−monoenes content in product/monoenes content in raw material)*100 isomerization rate of monoenes %=isomerized olefins content/(isomerized olefins content+alkanes content)*100 hydrogenation selectivity %=conversion rate of dienes/(conversion rate of dienes+conversion rate of monoenes)*100

Hydrogenation treatment was performed under the conditions of a pressure of 2.0 MPa, a space velocity of 4 $h^{-1}$, a temperature of 120° C., and a hydrogen/diene molar ratio of 5:1. Next, the contents of propanethiol, dienes, monoenes, isomerized monoenes and alkanes in hydrogenated products were analyzed.

Hydrogenation experiments were performed by using the catalysts of Comparative Examples 1~4 and Examples 1~5 respectively, and resulting experimental results are as shown in Table 2.

TABLE 2

Experimental results of respective Comparative Examples and Examples

| | Catalyst No. | | | | | | | | |
|---|---|---|---|---|---|---|---|---|---|
| | A | B | C | D | E | F | G | H | I |
| Conversion rate of propanethiol % | 100 | 99.0 | 98.0 | 98.5 | 100 | 100 | 100 | 100 | 99.0 |
| Conversion rate of dienes % | 87.2 | 85.1 | 75.7 | 82.7 | 88.5 | 88.5 | 89.5 | 89.8 | 87.8 |
| Isomerization rate of monoenes % | 51.3 | 35.6 | 32.6 | 45.6 | 52.5 | 52.8 | 53.7 | 54.1 | 51.5 |
| Hydrogenation selectivity % | 95.8 | 96.6 | 97.1 | 97.6 | 98.5 | 99.0 | 99.5 | 99.3 | 98.0 |

In the hydrogenation experiments of unsaturated compounds or a mixture containing unsaturated compounds, the method of the present invention has higher conversion rates of propanethiol and dienes, and isomerization rates of monoenes and hydrogenation selectivities are also apparently higher than those of the method in the Comparative Examples.

Examples 6~8

The experimental results obtained by using the Catalyst E in Catalyst Example 1, utilizing the same sulfuration method and feedstock of identical composition except for changing reaction conditions, are as shown in Table 3.

TABLE 3

Experimental results of Catalyst E under different conditions

| Example | 6 | 7 | 8 |
|---|---|---|---|
| Catalyst No. | E | E | E |
| Pressure MPa | 1.5 | 2.0 | 3.0 |
| Space velocity $h^{-1}$ | 2.0 | 4.0 | 3.0 |
| Temperature ° C. | 100 | 120 | 110 |
| Hydrogen/diene molar ratio | 10.0 | 5.0 | 15.0 |
| Conversion rate of propanethiol % | 100 | 100 | 100 |
| Conversion rate of dienes % | 89.2 | 88.5 | 88.2 |
| Isomerization rate of monoenes % | 53.1 | 52.5 | 52.7 |
| Hydrogenation selectivity % | 99.1 | 98.5 | 98.7 |

As can be seen from the above data, the catalyst illustrated in Example 1 has a good adaptability. The hydrogenation treatment of unsaturated compounds with this catalyst, which is operated in a wide range, can result in significantly high conversion rate of reaction products and selectivity.

INDUSTRIAL APPLICABILITY

The present invention increases the conversion rate and the selectivity for hydrogenation of a polyunsaturated compound and increases the isomerization ratio of a monounsaturated compound by selecting active components of a catalyst, optimizing acid distribution on the surface of the catalyst, especially further selecting suitable Group VIII/VIB metal ratio for the catalyst and a density of Group VIII non-noble metal per unit surface area of the catalyst. Isomerized olefins often have higher stabilities and octane values, which are usually very important to improve the properties of the unsaturated compounds or a mixture containing the unsaturated compounds.

By using the method of the present invention, the effect of hydrogenation treatment is improved notably, and the method provides higher conversion rate of thiols, higher saturation rate of dienes and better hydrogenation selectivity for dienes when it is used for hydrogenation of unsaturated compounds or a mixture containing the unsaturated compounds.

What is claimed is:

1. A method for selective hydrogenation of an unsaturated compound, comprising increasing, by weight, an amount of light sulphides present in the unsaturated compound, and isomerizing a monounsaturated compounds during selective hydrogenation of the unsaturated compound, wherein the selective hydrogenation is carried out in the presence of a catalyst having at least one Group VIB metal component and at least one Group VIII non-noble metal component supported on a carrier, wherein:
   the Group VIB metal component comprises a Group VIB metal oxide in an amount of from 4% to 10% by weight of the catalyst;
   the Group VIII metal component comprises a Group VIII non-noble metal oxide in an amount of from κ% to 15% by weight of the catalyst;
   the catalyst comprises a $B_{total}/L_{total}$ ratio of B acid to L acid in a surface acidity center of not more than 0.4; and a $L_{weak}/L_{strong}$ ratio of weak L acid to strong L acid in the surface acidity center of 0.5 to 2.0; and
   the carrier is substantially alumina.

2. The method according to claim 1, wherein
   the Group VIII non-noble metal oxide and the Group VIB metal oxide is are in a molar ratio of from greater than 3.0 mole/mole to 5.0 mole/mole; and
   the Group VIII metal oxide per unit surface area of the catalyst is not less than $8 \times 10^{-4}$ $g/m^2$.

3. The method according to claim 2, wherein the molar ratio of the Group VIII non-noble metal oxide to the Group VIB metal oxide in the catalyst is from 3.2 mole/mole to 5.0 mole/mole.

4. The method according to claim 1, wherein the Group VIB metal component comprises molybdenum, tungsten, or a combination thereof.

5. The method according to claim 1, wherein the Group VIII non-noble metal component comprises nickel, cobalt, or a combination thereof.

6. The method according to claim 1, wherein the Group VIB metal oxide is in an amount of from 6% to 8% by weight of the catalyst.

7. The method according to claim 1, wherein the Group VIII non-noble metal oxide is in an amount of from 8% to 12% by weight of the catalyst.

8. The method according to claim 1, wherein the Group VIII metal oxide per unit surface area of the catalyst is not less than $10 \times 10^{-4}$ $g/m^2$.

9. The method according to claim 1, wherein the ratio $B_{total}/L_{total}$ of B acid to L acid in the surface acidity center of the catalyst is from 0.05 to 0.3.

10. The method according to claim 1, wherein the ratio $L_{weak}/L_{strong}$ of weak L acid to strong L acid in the surface acidity center of the catalyst is from 0.5 to 1.5.

11. The method according to claim 1, comprising a total pore volume of the from 0.2 to 0.5 $cm^3/g$.

12. The method according to claim 1, comprising a specific surface of from 50 to 200 $m^2/g$.

13. The method according to claim 1, wherein the amount of alumina in the carrier is not less than 80 wt %.

14. The method according to claim 1, wherein the alumina comprises a crystal form selected from γ, δ, θ, and combinations thereof.

15. The method according to claim 1, wherein the catalyst is sulphurized before use, at a pressure of 0.5 to 3.0 MPa, a temperature of 200 to 500° C. and a space velocity of 0.5 to 5.0 $h^{-1}$.

16. The method according to claim 1, wherein the catalyst is used at a pressure of 1.0 to 5.0 MPa, a hydrogen/polyunsaturated compound molar ratio of 1 to 20 mole/mole, a space velocity of 2.0 to 6.0 $h^{-1}$ and a temperature of 50 to 250° C.

17. The method according to claim 16, wherein the pressure is 2.0 to 4.0 MPa, the hydrogen/polyunsaturated compound molar ratio is 1 to 10 mole/mole, the space velocity is 2.0 to 5.0 h$^{-1}$, and the temperature is 70 to 200° C.

18. The method according to claim 1, comprising a total pore volume of from 0.2 to 0.45 cm$^3$/g.

19. The method according to claim 1, comprising a specific surface of from 50 to 150 m$^2$/g.

20. The method according to claim 1, wherein the amount of alumina in the carrier is not less than 90 wt %.

* * * * *